US011120141B2

(12) United States Patent
Krishnamurthy et al.

(10) Patent No.: US 11,120,141 B2
(45) Date of Patent: Sep. 14, 2021

(54) SYSTEM AND METHOD FOR SELECTIVE DYNAMIC ENCRYPTION

(71) Applicant: JPMORGAN CHASE BANK, N.A., New York, NY (US)

(72) Inventors: Manjunath Sargur Krishnamurthy, Houston, TX (US); Karthigeyan Kuppan, Houston, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 260 days.

(21) Appl. No.: 16/023,793

(22) Filed: Jun. 29, 2018

(65) Prior Publication Data
US 2019/0005248 A1    Jan. 3, 2019

Related U.S. Application Data

(60) Provisional application No. 62/527,267, filed on Jun. 30, 2017.

(51) Int. Cl.
| | |
|---|---|
| *G06F 21/60* | (2013.01) |
| *G06F 21/62* | (2013.01) |
| *H04L 29/06* | (2006.01) |
| *G06F 16/951* | (2019.01) |
| *G06F 16/2452* | (2019.01) |

(52) U.S. Cl.
CPC ........ *G06F 21/602* (2013.01); *G06F 16/2452* (2019.01); *G06F 16/951* (2019.01); *G06F 21/6218* (2013.01); *H04L 63/0428* (2013.01); *H04L 63/0435* (2013.01);
(Continued)

(58) Field of Classification Search
None
See application file for complete search history.

(56) References Cited

U.S. PATENT DOCUMENTS 9,846,784 B1 * 12/2017 Murray ............... G06F 21/6218
2015/0372982 A1 * 12/2015 Herle .................. H04L 63/0272
726/15
(Continued)

OTHER PUBLICATIONS

Ambika et al., A survey on Data Security and Integrity in Cloud Computing, 2016, International Journal of Advanced Research on Computer Science, ISSN No. 0976-5697, pp. 57-63 (Year: 2016).*
(Continued)

*Primary Examiner* — Luu T Pham
*Assistant Examiner* — Edward X Long
(74) *Attorney, Agent, or Firm* — Hunton Andrews Kurth LLP (57) ABSTRACT

The invention relates to a computer-implemented system and method for selective dynamic encryption and decryption of data. The method may comprise the steps of identifying confidential data elements in a data table (e.g., confidential columns in a table) that contain confidential information; storing in a metastore behind a firewall the locations of the confidential data elements; intercepting a query to the database to add unencrypted confidential data elements; encrypting the unencrypted confidential data elements in computer memory; and transmitting to the public cloud the data table including the encrypted specific data elements and other data elements that have not been encrypted. The reverse process can be implemented for retrieving and selectively decrypting data stored in the cloud.

6 Claims, 4 Drawing Sheets

(52) U.S. Cl.
CPC .. *G06F 2221/2107* (2013.01); *H04L 63/0209* (2013.01); *H04L 2463/062* (2013.01)

(56) References Cited

U.S. PATENT DOCUMENTS

| | | | |
|---|---|---|---|
| 2016/0078088 A1* | 3/2016 | Venkatesh | G06F 16/24539 707/713 |
| 2017/0272472 A1* | 9/2017 | Adhar | H04L 63/20 |
| 2017/0302916 A1* | 10/2017 | Tiwari | H04L 12/4641 |

OTHER PUBLICATIONS

Chang et al., Towards Achieving Data Security with the Cloud Computing Adoption Framework, 2016, IEEE Transactions on Services Computing, vol. 96, No. 1, pp. 138-151 (Year: 2016).*

* cited by examiner

SYSTEM AND METHOD FOR SELECTIVE DYNAMIC ENCRYPTION

RELATED APPLICATION

This application claims priority to U.S. application Ser. No. 62/527,267, entitled "System and Method for Selective Dynamic Encryption," filed Jun. 30, 2017, which is hereby incorporated by reference.

FIELD OF THE INVENTION

The present invention relates generally to data security, and more particularly to a system and method for selectively encrypting and decrypting data fields to provide enhanced data security and computational efficiency.

BACKGROUND

Although many companies endeavor to provide the highest level of data security for the sensitive data in their custody, there are many situations in which computational efficiencies must be taken into account as well. For example, cloud computing options can offer significant advantages in efficiency to companies trying to maximize the value of their IT budget. However, cloud computing services can also introduce additional risks, as sensitive company data is turned over to a third party cloud provider. Cloud services providers generally offer encryption options such as disk-level encryption of a company's data stored in the cloud. However, when the company data stored in the cloud is particularly sensitive, this level of protection may not be sufficient to satisfy the company's risk tolerance. Additionally, the prospect of encrypting all company data at rest and in transit to and from the cloud may be prohibitively costly in terms of the computing resources involved and the resulting delay in response time of company systems.

These and other drawbacks exist with known systems and processes.

SUMMARY

Exemplary embodiments of the invention provide a system and method for dynamically encrypting and decrypting confidential data fields in a database. According to one embodiment, the invention comprises a method of selective dynamic encryption in a computer network comprising the steps of identifying confidential data elements in a data table (e.g., confidential columns in a table) that contain confidential information; storing in a metastore behind a firewall the locations of the confidential data elements; intercepting a query to the database to add unencrypted confidential data elements; encrypting the unencrypted confidential data elements in computer memory; and transmitting to the public cloud the data table including the encrypted confidential data elements and other data elements that have not been encrypted. The reverse process can be implemented for retrieving and selectively decrypting data stored in the cloud.

The invention also relates to computer-implemented system for selective dynamic encryption and decryption, and to a computer readable medium containing program instructions for executing a method for selective dynamic encryption and decryption.

Exemplary embodiments of the invention can provide a number of advantages to a business or organization in need of enhanced data security and computational efficiency. For example, embodiments of the invention allow a user to selectively encrypt only certain columns in a data table that contain sensitive information, thus protecting the most sensitive information that may be stored in a public cloud, but also avoiding decreased computational performance arising from encryption of all data. The system can also execute the encryption and decryption "on the fly" in computer memory, analogous to an executable program running in RAM. This enables seamless data transformations with less input/output (TO) operations, so that the clients are removed from the encryption and decryption process. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
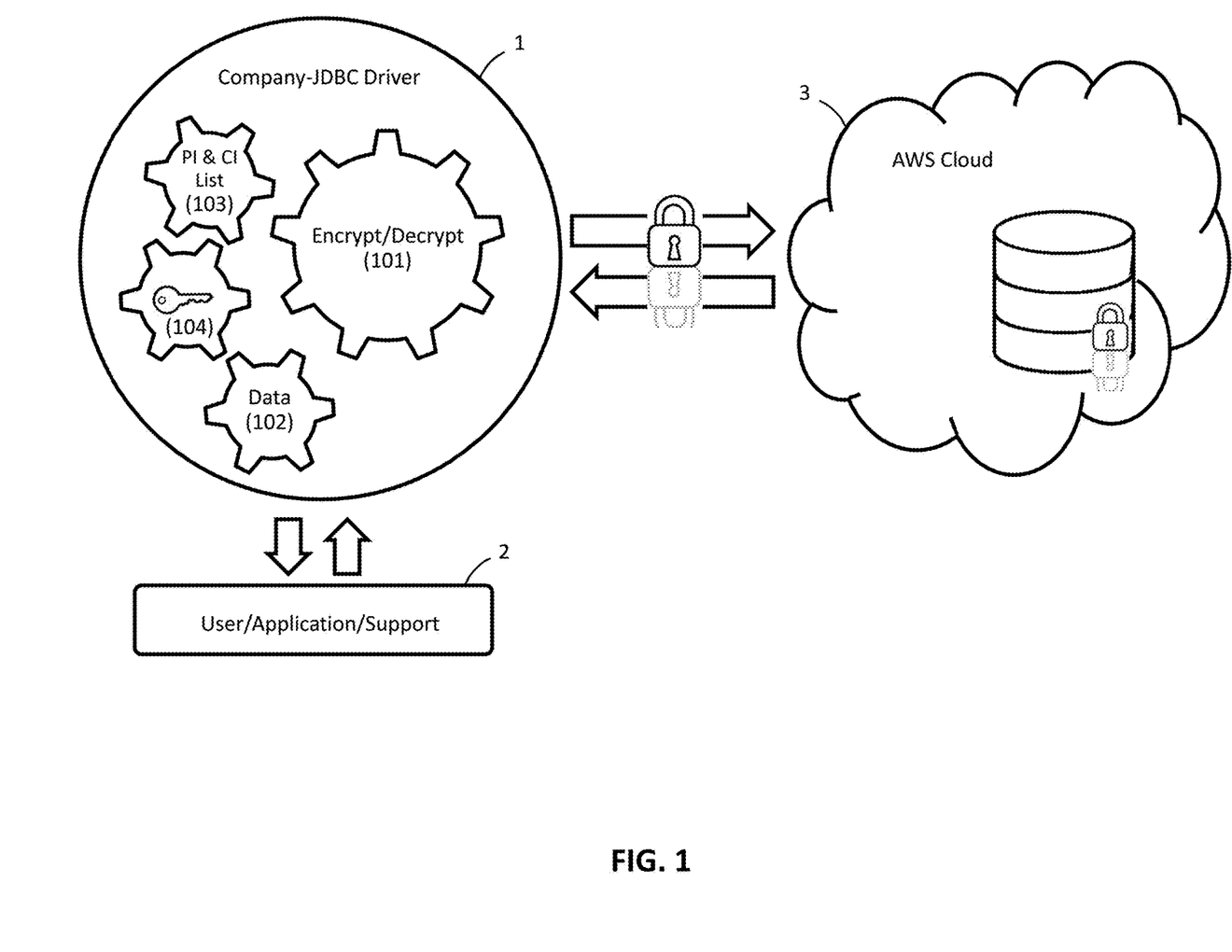
FIG. 1 is an overview diagram of an exemplary system for selective dynamic encryption of data according to one embodiment of the invention.

FIG. 1 is an overview diagram of an exemplary system and method for selective, dynamic encryption of data according to an embodiment of the invention. As shown in FIG. 1, the system includes a Company-JDBC driver 1. As used herein, "JDBC" refers to Java Database Connectivity, which may comprise an application programming interface (API) for the Java programming language that defines how a client accesses a database. As used herein, "Company" refers generally to a company or other type of organization that uses, stores, and processes data. The Company JDBC driver is a system (e.g., computer server(s) and software) that manages the selective dynamic encryption of Company data 102. Although the following description will use the example of JDBC, other types of database connectivity systems can be used with various embodiments of the invention, such as an Open Database Connectivity (ODBC) system, as will be appreciated by those skilled in the art.

The Company JDBC driver may include software installed on a server located behind a Company firewall. The Company JDBC driver may comprise or call upon an encryption/decryption module 101 that encrypts and decrypts Company data. The encryption/decryption module may comprise a known or commercially available encryption/decryption software or algorithms as will be appreciated by those skilled in the art. Examples of suitable encryption/decryption modules may include Authenticated Lightweight Encryption (ALE) 256, Cipher Block Chaining (CBC), and/or 8-bit padding, for example. The encryption/decryption module 101 is linked to certain Company resources, including a list of personal information and confidential information (PI & CI list 103), an encryption key management service (KMS) and/or hardware security modules (HSM) 104, and Company data 102, as shown in FIG. 1. As will be described further below, the Company JDBC driver may be configured and operated by one or more Company users who desire to selectively encrypt certain Company data used by one or more applications. The Company JDBC driver may also be used by certain support personnel at the Company who assist with the configuration, operation, and maintenance of the driver to encrypt certain data that is transmitted to a cloud provider. Such users and support personnel 2 may access and control the system using personal computing devices such as desktop computers, laptop computers, tablet computers, or other mobile computing devices, for example. The third party cloud provider 3 may be Amazon Web Services (AWS), for example, or other similar provider of cloud storage and cloud computing services.

Figure 2:
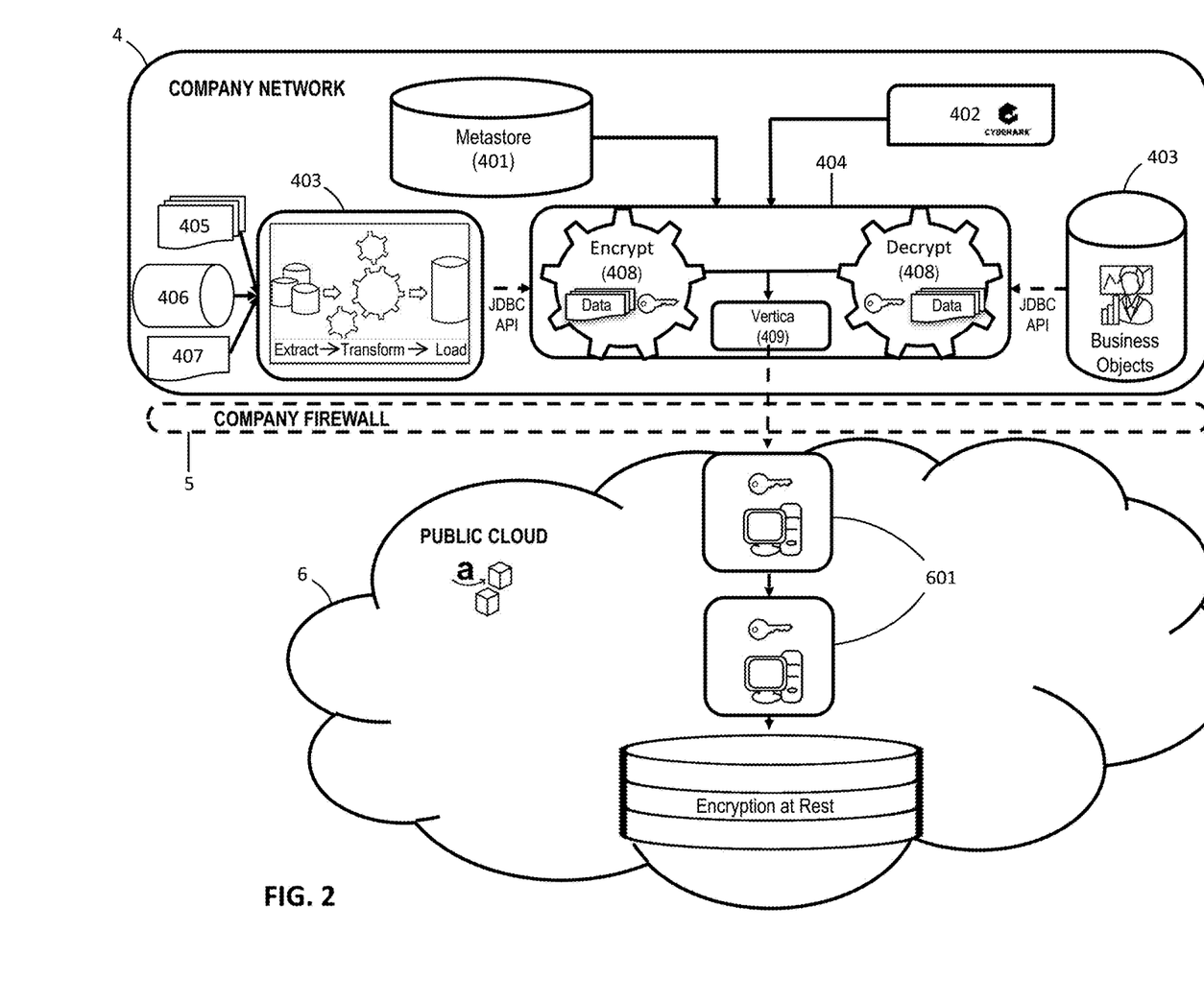
FIG. 2 is a diagram of an exemplary system for selective dynamic encryption of data illustrating a company JDBC driver wrapper according to an exemplary embodiment of the invention.

FIG. 2 shows a diagram of a Company JDBC driver according to an exemplary embodiment of the invention. The top half of FIG. 2 shows the Company network 4 behind the Company firewall 5. The bottom half of FIG. 2 shows the third party cloud service and data center 6 where Company data may be stored and processed. As shown in FIG. 2, the Company network may include a number of components, such as a metastore 401, an encryption KMS 402 (e.g., provided by a security company such as Cyberark), client software applications 403 (e.g., Informatica's ETL system, SAP's Business Objects, etc.), and the encryption/decryption modules 408.

The Company data may include data that is stored, used, and processed by client applications such as SAP's reporting tool Business Objects. Client application functionality may include, for example, connecting to different data sources, merging data, and generating reports in formats such as PDF, CSV, and XLS. The Company data may be accessed behind the firewall using a JDBC API, for example. The Company data may also include live feeds 405, a data modification and amendment tool (DMA) used to correct invalid data 406, and a housekeeping tool (HSKPNG) used for data assurance and corrections 407, according to one particular example. This data may be processed by an Extract/Transform/Load ("ETL") system such as that provided by Informatica in order to extract and reformat the data from various sources into a form that can be used with the Company JDBC driver. Live feeds, DMA tools, HSKPNG tools, and ETL systems all may need to connect to the Database in the third party cloud provider. The JDBC Driver provides the mechanism by which these applications can connect to the Database and also facilitates encryption and decryption of data. For example, an ETL system may be used to transform data from one form to another or to generate data summaries. The ETL system reads the required data set and decrypts the Company encrypted information through the JDBC driver. Similarly, a DMA tool may be used to correct or adjust data. Before corrections, the data must be read through the JDBC driver.

The metastore may comprise a database behind the Company firewall that stores metadata. The metastore may store, among other things, the list of personal information and confidential information (the PI & CI list). The metastore may contain, for example, a list of data in the format {table name, column name, key used to encrypt}. When there is a change to the PI/CI content, an encryption key is retrieved using {Table name, column name}, and the changed data is encrypted using the key. The encrypted changed data may then be inserted back into the database.

The PI & CI list may identify various data elements stored in data tables that are considered personal information or confidential information and that are to be encrypted at a field level. According to one embodiment, the PI & CI list identifies table columns to be encrypted. For example, a table storing trade data may include separate columns for the client name, the security being traded, the trade date, the dollar amount, and the quantity of the security being traded. The Company may conclude that the sensitive data needing to be encrypted may only be the client name located at a particular column of the table. If the client name is encrypted, the remainder of the data in the table (i.e., security being traded, trade date, dollar amount, quantity) is not particularly sensitive. In this example, the PI & CI list may identify, among other things, the column of that table that contains the client name as the particular data that needs to be encrypted. In one embodiment, line of business (LOB) risk assessment may update the PI and CI list, which will in turn be used to update the metastore.

According to a preferred embodiment of the invention, the PI & CI list in the metastore is constructed to contain a complete list of the tables and the columns containing sensitive information to be encrypted (e.g., column "G" in table "XYZ" stores social security numbers of individual customers; column "J" in table "ABC" stores surnames, etc.). The PI & CI list identifies the columns that have sensitive data. The sensitive data in those columns is encrypted and can then be transmitted to and from and stored more securely in a public cloud or other type of cloud or data center.

The encryption and decryption processes are executed "on the fly" according a preferred embodiment of the invention. In particular, the Company JDBC driver may comprise a wrapper 404 built around the vendor-provided (e.g., Oracle/MySQL/Vertica) database driver 409 and the JDBC driver can be configured to intercept the SQL query or other query, according to an exemplary embodiment of the invention. The wrapper may contain, for example, connection, parsing, execution, projection, and response components. The execution component uses the vendor JDBC driver to submit the parsed SQL and get the result. The SQL query is parsed by the wrapper so that all fields that are to be encrypted or decrypted (e.g., table columns identified in the PI & CI list) are identified. The SQL query may be parsed using standard methods, for example by translating the SQL query into hierarchical SQL objects, which can thereafter be navigated and edited according to the encryption/decryption processes. According to a preferred embodiment, the encryption and decryption processes are executed in computer memory associated with a CPU (e.g., analogous to an executable loaded into RAM for running a computer program) rather than being conducted and stored on another type of storage medium such as a hard drive. These features enable the Company JDBC driver to execute selective encryption dynamically ("on the fly"), and without the user having to manage or even need to know about the encryption or decryption process taking place.

In one embodiment, dynamic encryption may be performed by loading the metastore at the start of an application. Using the metastore, the Company JDBC driver retrieves the encryption key. The encryption key is used to encrypt the value in SQL in the parsing phase. The same metastore may be used to get the keys to decrypt the result from the database. Encryption and decryption keys are represented in situ as key symbols in FIG. 2, within Encrypt and Decrypt 408 modules. The keys may be stored in a KMS.

After the Company JDBC driver executes the encryption of select columns of data in a table, it replaces the value of the unencrypted data with the encrypted string. In the example of the table described above, the Company JDBC driver would encrypt the data elements in the column for "client name" and then replace the unencrypted client name with the encrypted string, all executed "on the fly" in computer memory.

The reverse process is executed for decryption. That is, the Company JDBC driver intercepts the SQL query, and upon receiving data from the public cloud, retrieves from the PI & CI list in the metastore an identification of the columns that have been selectively encrypted. The Company JDBC driver then decrypts the data in those columns and replaces the encrypted data with the decrypted data before storing the unencrypted data on a system behind the Company firewall.

The encryption keys are stored on premises on Company servers behind the Company firewall according to a preferred embodiment of the invention. For example, the encryption keys and encryption types can be stored on Company premises in the metastore or other on premises location using KMS, HSM, and/or any other tools used to store keys safely. According to a preferred embodiment of the invention, each field in the database is encrypted with a different key.

The KMS is an internal key store. All the keys are securely stored in the KMS. From the KMS, keys can be accessed only by authorized users and key retrievals are auditable. General internet proxies are set up to allow the traffic only from specific hosts.

FIG. 2 also illustrates the use of two jump hosts 601 (also sometimes referred to as jump servers) and associated authentication keys (illustrated as key symbols in FIG. 2 within each jump host 601), which are used to provide encryption in transit. The jump host provides a physical layer separation between the Company and the public cloud network. The jump host provides a layer of separation, for example, because it is in a TIER 2 zone, which cannot be accessed from TIER 3 applications or machines. The Vertica JDBC driver is located on a client server behind the Company firewall. The client issues a query to the Vertica database which is running in the public cloud. The issued query is transmitted to the public cloud infrastructure via the jump host. The keys for the jump host in the third party cloud will be generated from the third party cloud service. The keys for the jump host on the Company network side will be generated by the Company network.

Figure 3:
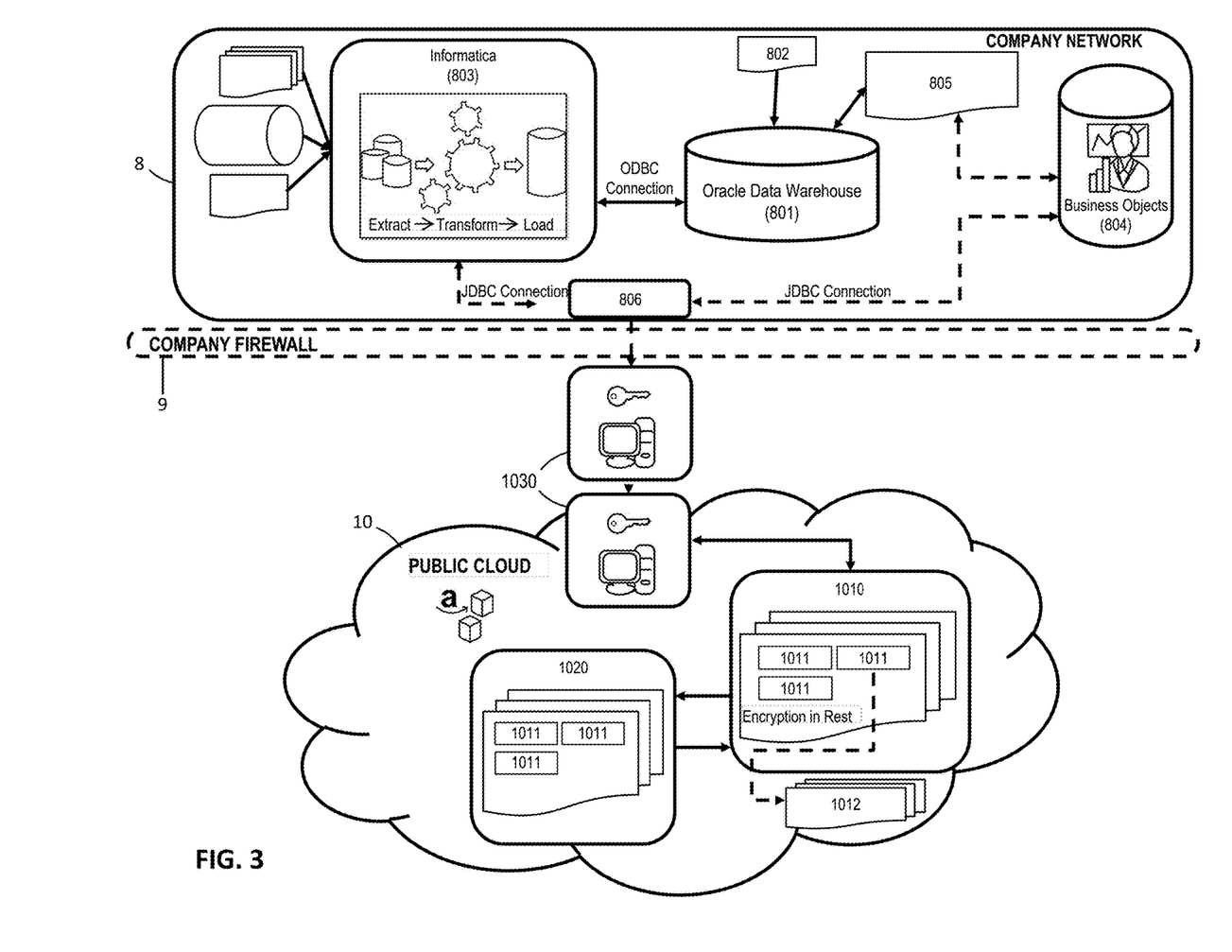
FIG. 3 is a diagram of an exemplary system for selective dynamic encryption of data illustrating security processes in a public cloud environment according to an embodiment of the invention.

FIG. 3 is a diagram that illustrates additional features of the system according to an exemplary embodiment of the invention. FIG. 3 illustrates, for example, additional components and connections within the Company network. The Oracle Data Warehouse 801 is a warehouse inside Company network 8, behind the Company Firewall 9. Data flows into Oracle Data Warehouse from multiple sources, for example confidential data source 805. The Company JDBC wrapper 806 will be used in the data clients which connect to Vertica on the public cloud. Data clients are the applications which consume data, for example DMA 802, Informatica 803, and SAP's Business Objects 804. As in FIG. 2, communications with the third party cloud service are intercepted by the JDBC wrapper 806 then travel through jump hosts 1030 (with authentication keys illustrated by key symbols within the jump hosts) to the third party cloud service 10. Communication between systems within the Company network need not use the JDBC wrapper for encryption/decryption, because data is not being transmitted to the public cloud. The Oracle Data Warehouse, for example, may communicate with an Informatica ETL system 803 via a standard ODBC system.

FIG. 3 also illustrates additional features of the system as configured in the public cloud. According to one embodiment of the invention, the system in the public cloud 10 includes a feed & reporting cluster 1010, which may be a small cluster with ten or less nodes for serving reports and daily data ingestion. The feed & reporting cluster may run continuously (e.g., 24 hours a day, seven days a week), for example. The feed & reporting cluster may utilize Amazon Elastic Block Store (EBS) volumes 1011, for example, and/or Amazon S3 storage 1012 for backups according to one embodiment of the invention. The system may also include an Aggpoint Cluster 1020 that is a large cluster with fifteen or more nodes for processing calculations and that may be active for only certain periods during a day (e.g., 4 hours a day) according to one example. The Aggpoint Cluster 1020 may also utilize EBS volumes 1011, for example.

Figure 4:
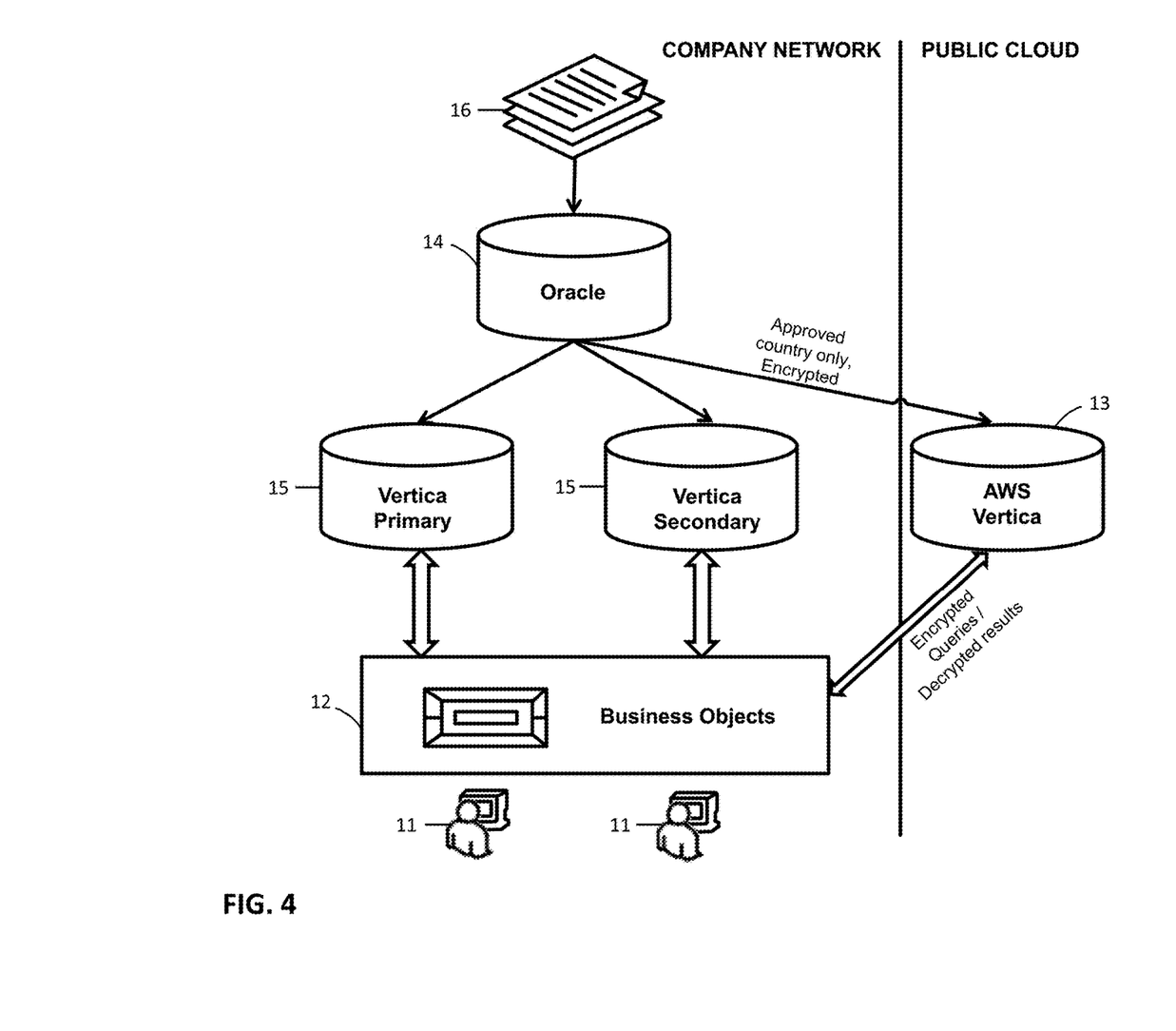
FIG. 4 is an overview diagram illustrating how a client application in an exemplary system connects with a third party cloud service provider using selective dynamic encryption of data according to one embodiment of the invention.

FIG. 4 is an overview diagram illustrating how a client application in an exemplary system connects with a third party cloud service provider using selective dynamic encryption of data according to one embodiment of the invention. In the illustrated embodiment, users 11 utilize client application 12, for example Business Objects. Client application 12 connects and consumes data from a third party public cloud service 13, for example AWS, through a JDBC driver configured for selective dynamic encryption. Queries are encrypted within the company network by the JDBC driver, and the results returned from the third party public cloud service are decrypted. Business Objects may also make read only queries to an Oracle Data Warehouse 14 over the Company network through Vertica drivers 15. The Oracle Data Warehouse may receive data from multiple sources, for example the feed files 16 illustrated in FIG. 4.

In one embodiment, an Oracle Data Warehouse 14 may also communicate with the third party public cloud service 13, using the JDBC driver for selective dynamic encryption. Communications with the third party public cloud service may also be limited to approved countries only.

Although the foregoing examples show the various embodiments of the invention in one physical configuration; it is to be appreciated that the various components may be located at distant portions of a distributed network, such as a local area network, a wide area network, a telecommunications network, an intranet, and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers and personal computers described above and shown in the figures may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications networks used with the system may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications networks used with the system may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection, or another wired or wireless, digital or analog interface or connection.

In some embodiments, the communication networks used with the system may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, the communications network may comprise a Personal Branch Exchange (PBX), which may further connect to the PSTN.

Although examples of servers and personal computing devices have been described above, exemplary embodiments of the invention may utilize other types of communication devices whereby a user may interact with a network that transmits and delivers data and information used by the various systems and methods described herein. Personal computing devices that may be used by users or support personnel to access and control the system may include desktop computers, laptop computers, tablet computers, smart phones, and other mobile computing devices, for example. The servers and personal computing devices may include a microprocessor, a microcontroller, or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED), or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described herein may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of user interfaces may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for providing selective dynamic decryption in a computer network, the method comprising the steps of:
    identifying a list of confidential data elements in a database that contain confidential information wherein the confidential data elements comprise columns in at least one table in the database wherein the database is stored within a third party cloud service provider separate from the computer network and wherein the computer network is behind a firewall;
    encrypting the confidential data elements in the database wherein each field in the database is encrypted with a different key;
    leaving at least some other data elements in the database unencrypted;
    storing in a metastore component within the computer network the locations of the confidential data elements in the database;
    intercepting from an application in the computer network a query to the database requesting one or more of the encrypted confidential data elements;
    querying the database, at the third party cloud service provider, for the encrypted confidential data elements such that the querying comprises transmitting the query through one or more jump hosts that implement encryption in transit;
    decrypting the encrypted confidential data elements sent in response to the query, wherein encryption and decryption keys for the confidential data elements are stored on the computer network in the metastore component; and
    transmitting to the application the decrypted confidential data elements queried.

2. The method of claim 1, wherein the step of identifying confidential data elements in a database that contain confidential information further comprises updating the list according to a risk assessment.

3. A computer-implemented method for providing selective dynamic encryption in a computer network, the method comprising the steps of:
    identifying a list of confidential data elements in a database that contain confidential information wherein the confidential data elements comprise columns in at least one table in the database wherein the database is stored with a third party cloud service provider separate from the computer network and wherein the computer network is behind a firewall;
    encrypting the confidential data elements in the database wherein each field in the database is encrypted with a different key;
    leaving at least some other data elements in the database unencrypted;
    storing in a metastore component within the computer network the locations of the confidential data elements in the database;
    intercepting, from an application in the computer network, a query to the database at the third party cloud service provider seeking to add an unencrypted new data element to the database at the location of a confidential data element wherein the query to the database at the third party cloud service provider is transmitted through one or more jump hosts that implement encryption in transit;

encrypting the unencrypted new data element, wherein encryption and decryption keys for the confidential data elements are stored on the computer network in the metastore component; and transmitting to the database the query to add the encrypted new data element.

4. The method of claim 3, wherein the step of identifying confidential data elements in a database that contain confidential information further comprises updating the list according to a risk assessment.

5. A computer-implemented system for providing selective dynamic encryption and decryption in a computer network, the system comprising:

one or more computers in the network;

a database connected to the network, the database being stored with a third party cloud service provider separate from the network and wherein the network is behind a firewall;

a memory to store data from at least one data source; and a computer processor that is programmed to:

identify a list of confidential data elements in the database that contain confidential information wherein the confidential data elements comprise columns in at least one table in the database;

store in the memory the locations of the confidential data elements in the database;

intercept queries from an application to the database on the network;

compare the locations in each query against the locations of the confidential data elements;

store encryption and decryption keys for the confidential data elements in the memory;

encrypt the new data in queries seeking to add new data to the location of a confidential data element and encrypt each field in the database with a different key;

submit the queries to the database at the third party cloud service provider, wherein the queries to the database at the third party cloud service provider further comprise transmitting the request through one or more jump hosts that implement encryption in transit;

decrypt any encrypted confidential data elements returned from the database;

transmit database response to the application.

6. The system of claim 5, wherein the processor is further programmed to update locations of the confidential data elements in the database according to a risk assessment.

* * * * *